(No Model.)
2 Sheets—Sheet 1.
C. P. HIGGINS.
MACHINE FOR FORMING AND PUNCHING POLYGONAL TUBES.
No. 336,852. Patented Feb. 23, 1886.
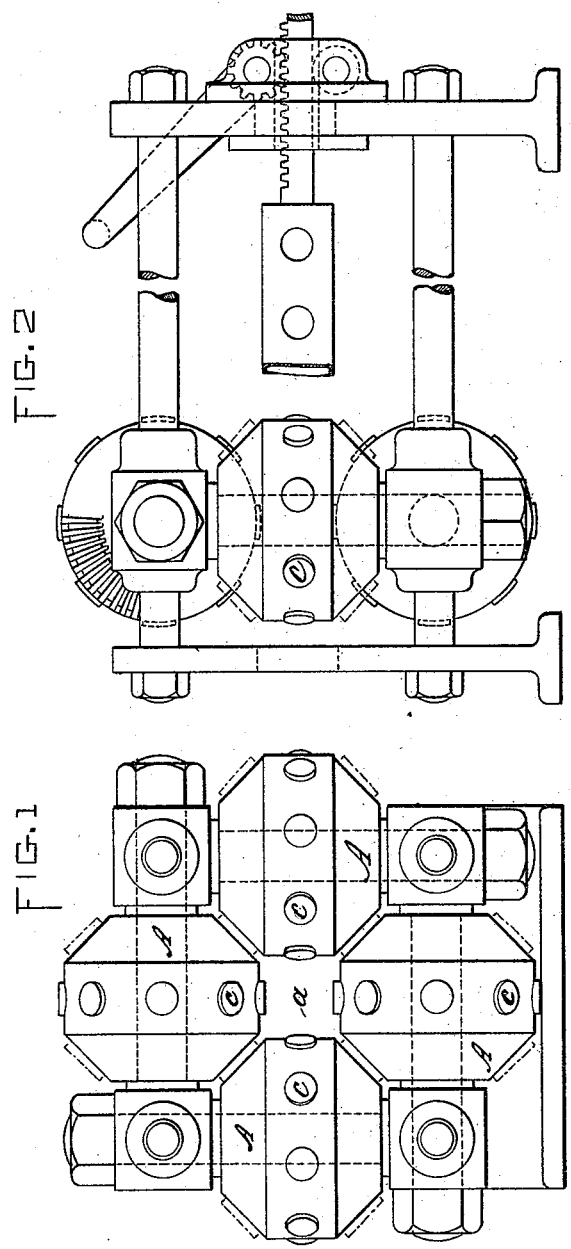

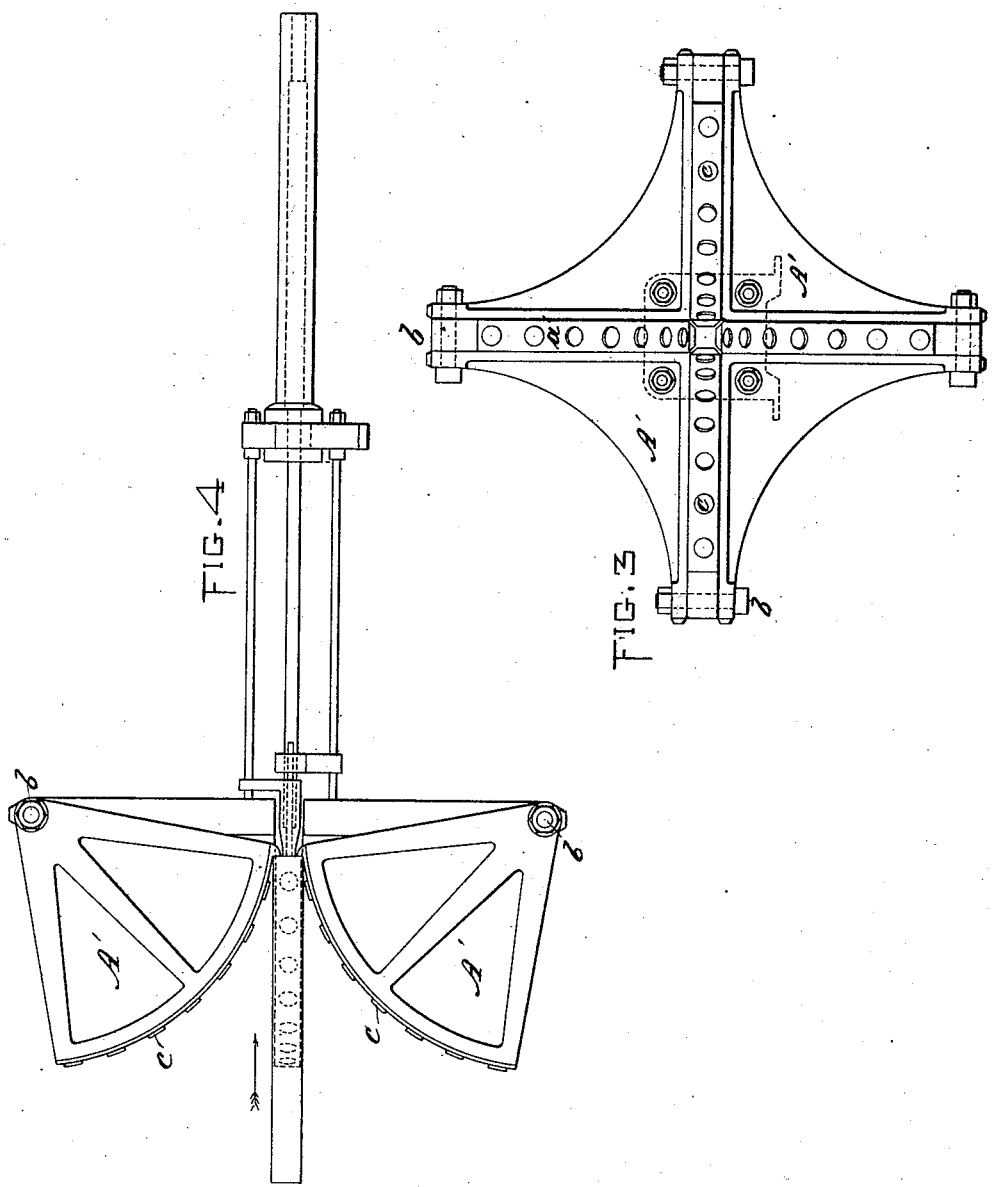

UNITED STATES PATENT OFFICE.

CAMPBELL P. HIGGINS, OF PHILADELPHIA, PENNSYLVANIA.

MACHINE FOR FORMING AND PUNCHING POLYGONAL TUBES.

SPECIFICATION forming part of Letters Patent No. 336,852, dated February 23, 1886.

Application filed October 10, 1885. Serial No. 179,492. (No model.)

*To all whom it may concern:*

Be it known that I, CAMPBELL P. HIGGINS, a citizen of the United States, residing at Philadelphia, Pennsylvania, have invented certain new and useful Improvements in Machines for Forming and Punching Polygonal Tubes, of which the following is a specification, reference being had to the accompanying drawings, forming a part thereof, in which—

Figures 1 and 3 are end elevations, and Figs. 2 and 4 side views, of a machine embodying my invention.

Similar letters of reference indicate corresponding parts in the several figures.

In order that others may understand and use my invention, I will first proceed to describe a machine embodying the same, and subsequently to point out in the claim its novel features.

The machine shown in the present instance is adapted to the construction of headers for sectional steam-generators; but the invention is applicable to the manufacture of polygonal tubes for other purposes.

In the drawings, A represents four rollers journaled in a frame-work, with their axes at right angles to each other, each roller being fitted with meshing miter-gearing for producing a simultaneous motion. (Shown in Fig. 2.) The working-faces of the respective rollers are parallel with their axes and their size and diameter conformed to the intermediate space shown at *a*, Fig. 1, for the reception and formation of the size of tube desired. Around the periphery of the working-faces of the rollers a series of projecting punches, *c*, are fixed at such distances apart as required to produce holes through the flattened sides of the blank as it is passed between them. A square mandrel is provided, constructed with dies upon each of its sides, for the reception of the punches as they pass through the blank.

In Figs. 3 and 4 of the drawings a modification of my invention is shown, consisting of four segments, A, pivoted to a frame-work, as shown at *b*, and arranged at right angles to each other, their working-faces being provided with projecting punches *c*, and the mandrel carrying the blank provided with corresponding dies, the same as referred to in reference to Figs. 1 and 2.

In operation, a cylindrical tube-blank is slipped over the mandrel, which is fed between the rollers or segments, as shown in Fig. 4, which produces a polygonal shape of the blank in cross-section, and holes are subsequently punched through its flattened sides as the mandrel is advanced.

The application of power for operating the mandrel may consist of a connected rack and pinion, as shown, for example, in Fig. 2, or other well-known means, and a sectional mandrel may also be employed that I have described in connection with another machine for accomplishing the same purpose in a separate application filed simultaneously herewith. Therefore, What I herein claim, and desire to secure by Letters Patent, is—

In a machine for forming and punching polygonal tubes, the combination, with a series of rollers or equivalent devices mounted with their working-faces parallel with their axes and at right angles to each other, of a mandrel for carrying the blank, the working-faces of the rollers being provided with punches and the mandrel with corresponding dies, as set forth.

CAMPBELL P. HIGGINS.

Witnesses:
CHAS. F. SIMMONS,
ALEXANDER RICKEY.